US008944902B2

(12) United States Patent
Capone et al.

(10) Patent No.: US 8,944,902 B2
(45) Date of Patent: Feb. 3, 2015

(54) CARD GAME

(76) Inventors: Tammy L. Capone, East Haven, CT (US); Francis Capone, East Haven, CT (US)

(*) Notice: Subject to any disclaimer, the term of this patent is extended or adjusted under 35 U.S.C. 154(b) by 156 days.

(21) Appl. No.: 13/548,841

(22) Filed: Jul. 13, 2012

(65) Prior Publication Data

US 2013/0017875 A1 Jan. 17, 2013

Related U.S. Application Data

(60) Provisional application No. 61/572,447, filed on Jul. 16, 2011.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 1/00* | (2006.01) |
| *A63F 3/00* | (2006.01) |
| *G07F 17/32* | (2006.01) |

(52) U.S. Cl.

CPC ............... *A63F 1/00* (2013.01); *A63F 3/00157* (2013.01); *G07F 17/3293* (2013.01)

USPC ......... 463/11; 463/6; 463/16; 463/20; 463/29

(58) Field of Classification Search

USPC ...................................... 463/6, 11, 16, 20, 29

See application file for complete search history.

(56) References Cited

U.S. PATENT DOCUMENTS

| | | | | |
|---|---|---|---|---|
| 5,413,353 | A * | 5/1995 | Demarest et al. | 273/292 |
| 7,631,875 | B2 | 12/2009 | Jones et al. | |
| 7,726,654 | B2 | 6/2010 | Durbin | |
| 7,775,524 | B2 | 8/2010 | Lutnick et al. | |
| 7,803,042 | B2 | 9/2010 | Shuster | |
| 7,963,836 | B2 | 6/2011 | Goetsch et al. | |
| 2006/0027967 | A1 * | 2/2006 | Chen | 273/292 |

* cited by examiner

*Primary Examiner* — Adetokunbo O Torimiro

(74) *Attorney, Agent, or Firm* — Raggio & Dinnin, P.C.

(57) ABSTRACT

A methodology for playing a card game on a table or an electronic device. The methodology includes a dealer using a standard deck of 52 cards and three additional jokers. Each player in the card game places a bet and if the player loses his bet during the game they are allowed to immediately place a new bet and reenter the same game. If a player wins and his bet is paid he may make the same initial bet amount. The game ends when three jokers are played or if a joker is the first card out of the deck.

20 Claims, 5 Drawing Sheets

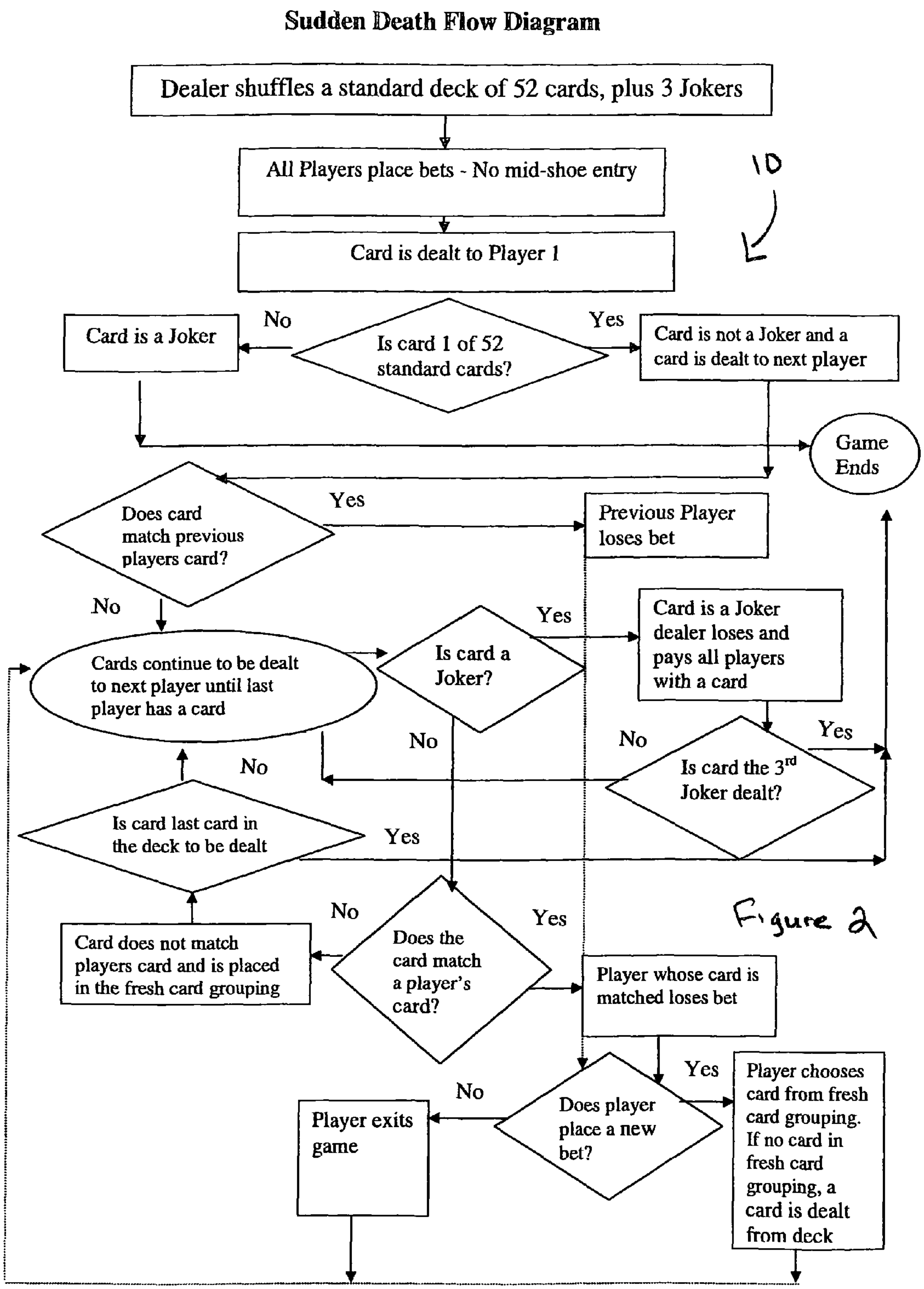
Sudden Death Flow Diagram
Dealer shuffles a standard deck of 52 cards, plus 3 Jokers
All Players place bets - No mid-shoe entry
10
Card is dealt to Player 1
Card is a Joker
No
Is card 1 of 52 standard cards?
Yes
Card is not a Joker and a card is dealt to next player
Game Ends
Does card match previous players card?
Yes
Previous Player loses bet
No
Cards continue to be dealt to next player until last player has a card
Is card a Joker?
Yes
Card is a Joker dealer loses and pays all players with a card
No
No
Yes
Is card the 3rd Joker dealt?
No
Is card last card in the deck to be dealt
Yes
Figure 2
No
Yes
Card does not match players card and is placed in the fresh card grouping
Does the card match a player's card?
Player whose card is matched loses bet
Yes
No
Player exits game
Does player place a new bet?
Player chooses card from fresh card grouping. If no card in fresh card grouping, a card is dealt from deck

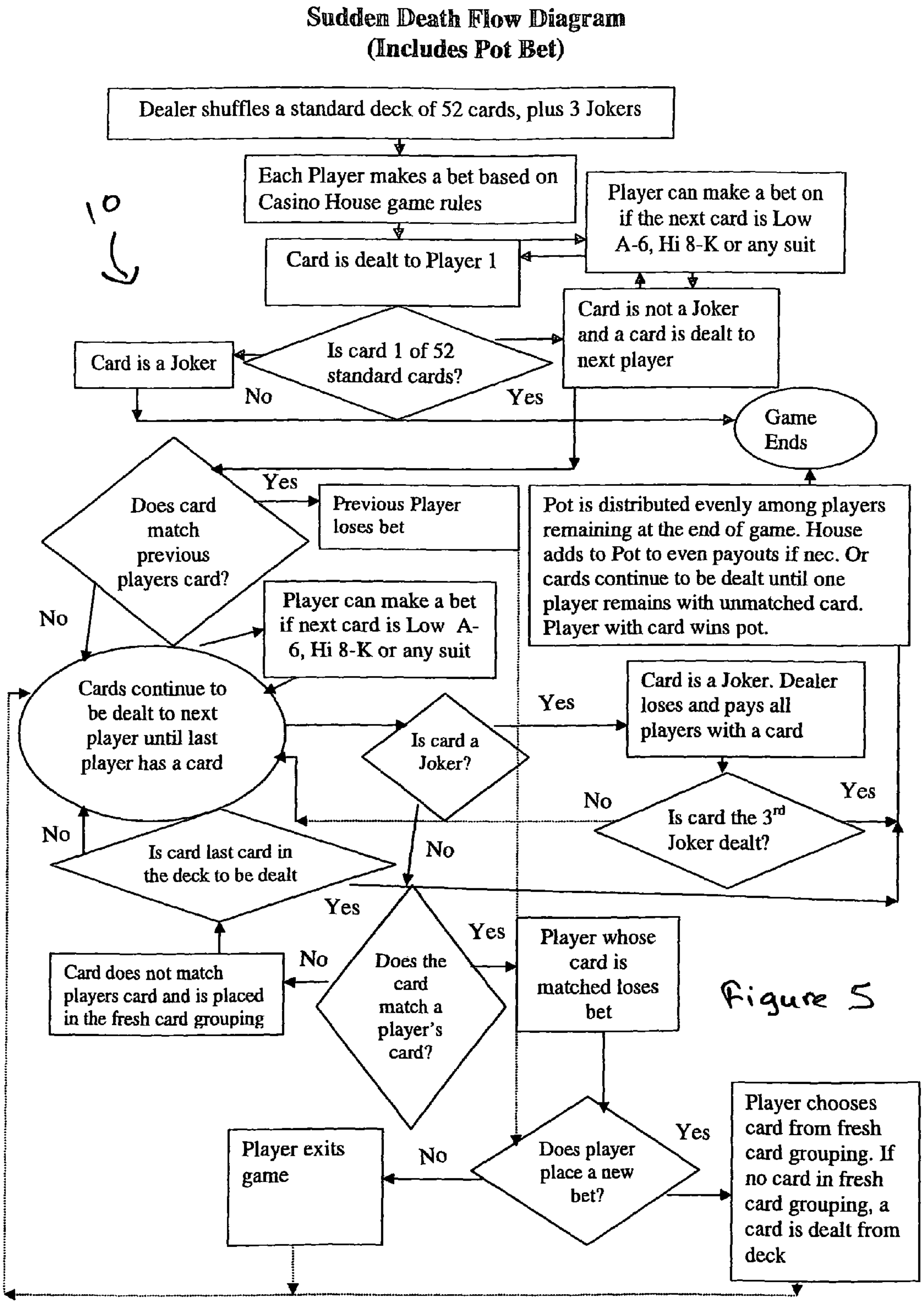
Sudden Death Flow Diagram
(Includes Pot Bet)
Dealer shuffles a standard deck of 52 cards, plus 3 Jokers
Each Player makes a bet based on Casino House game rules
Player can make a bet on if the next card is Low A-6, Hi 8-K or any suit
10
Card is dealt to Player 1
Card is not a Joker and a card is dealt to next player
Card is a Joker
Is card 1 of 52 standard cards?
No
Yes
Game Ends
Yes
Does card match previous players card?
Previous Player loses bet
Pot is distributed evenly among players remaining at the end of game. House adds to Pot to even payouts if nec. Or cards continue to be dealt until one player remains with unmatched card. Player with card wins pot.
No
Player can make a bet if next card is Low A-6, Hi 8-K or any suit
Cards continue to be dealt to next player until last player has a card
Yes
Card is a Joker. Dealer loses and pays all players with a card
Is card a Joker?
No
Yes
Is card the 3rd Joker dealt?
No
Is card last card in the deck to be dealt
No
Yes
Yes
Player whose card is matched loses bet
No
Card does not match players card and is placed in the fresh card grouping
Does the card match a player's card?
Figure 5
Player chooses card from fresh card grouping. If no card in fresh card grouping, a card is dealt from deck
Yes
Player exits game
No
Does player place a new bet?

CARD GAME

This application claims the benefit of U.S. Provisional Patent Application 61/572,447 filed Jul. 16, 2011.

BACKGROUND OF THE INVENTION

1. Field of the Invention

The present invention generally relates to a card game, and more particularly, relates to a table card game using at least one standard deck of cards and three Jokers and involving wagering based on a dealt hand of the cards.

2. Description of Related Art

Many different wagering games involving cards are played by individuals via computers and table games and the like. These games may involve the individuals playing against the dealer or against each other. Many of these games are wagering games that are intended to be exciting and arouse the player's interest. Typically, these wagering games are also uncomplicated and can be understood easily by a large number of players. Ideally, the wagering games should include more than one wagering opportunity during the course of the game, yet be able to be played rapidly to a wager resolving outcome. The concept of exciting play and the opportunity to make more than one wager and rapid wager resolution enhances a player's interest and enjoyment because the number of betting opportunities and bet resolution is increased. Many of these wagering games are well known in the art such as black jack or 21, also many poker type games where players at the table are generally playing against all of the other players at the table with one player winning each hand.

Many of these wagering games, particularly those that are capable of being played in casinos may provide a player with a sense of participation and control, the opportunity to make decisions, and reasonable odds of winning even though the odds generally favor the casino, house, dealer or banker. Generally, these wagering games may employ a standard 52 card deck as is well known in the art. It should be noted that most of these games use a 52 card deck wherein 13 cards are available for each suit and may involve additional cards generally referred to as Joker or wild cards. Furthermore, many of these prior art card games may be played using actual cards or electronically on a video gaming system. The electronic card wagering games may involve a machine, such as a video poker machine, where an individual plays against that machine, or a computer, where an individual may access a virtual casino over the Internet and play similar to a video poker machine or against a virtual or real dealer or against other individuals connected to the same virtual casino.

Therefore, there is a need in the art for a wagering game for playing at casinos. Furthermore, there is a need in the art for a card game that is uncomplicated, exciting and provides the opportunity for players to make multiple wagers and choices regarding those wagers during the play of a game. Furthermore, there is a need in the art for a card game that is capable of being played against the dealer and is capable of being played in the form of a pot bet that may be evenly distributed among players remaining at the end of a game.

SUMMARY OF THE INVENTION

One object of the present invention may be to provide an improved card game.

Another object of the present invention may be to provide a card game that uses at least one standard deck of 52 cards and three additional Jokers.

Yet a further object of the present invention may be to provide a card game that allows for a player to lose a bet but then reenter the match by placing a new bet.

Still another object of the present invention may be to provide a card game wherein if a dealt card does not match a player's card, that card is placed in a fresh card grouping.

Still another object of the present invention may be to provide a card game wherein cards arranged in a fresh card grouping are taken by a player who has previously lost a bet and enters a new bet to reenter the game.

According to the present invention, the foregoing and other objects and advantages are obtained by a novel methodology for playing a card game. This methodology includes a dealer using at least one standard deck of 52 cards and three additional Jokers. Each player in the card game places a bet and the player who loses his bet during the game is allowed to immediately place a new bet and reenter the same game. In the methodology the player who loses his bet may also choose to not reenter the same game. If a player wins and his bet is paid he remains in the game at the same initial bet amount. The game also features that a players bet cannot be taken down at any time throughout the game, if a player is in the game, loses his bet and chooses to place another bet, then this player is the first to receive the next card in the game. The methodology of playing the game has the game ending when three Jokers are played or if a Joker is the first card out of the deck. If the first card is out of the deck is a Joker, the players are not paid and the house does not collect any bets.

One advantage of the present invention may be that it provides for an improved card game.

A further advantage of the present invention may be that it provides for an improved card game that is capable of being played as a casino table game, general gaming, and as a video, computer and/or Internet based gaming card game.

Still a further advantage of the present invention may be that it provides for a card game that has a dealer using at least one standard deck of 52 cards plus three Jokers.

Yet another advantage of the present invention may be that it provides for a card game that allows for multi bets by each player within the same game.

Still another advantage of the present invention may be that it provides for a card game that allows the player who loses his bet during the game to immediately place a new bet and stay in the same game.

Still another advantage of the present invention may be that it provides for a card game that if a player wins and his bet is paid, he remains in the game.

Still yet a further advantage of the present invention may be that it provides for a card game wherein a players bet may not be taken down at any time throughout the game.

Still another advantage of the present invention may be that it provides for a card game that if a player is in the game loses his bet and chooses to place another bet, then this player is the first to receive the next card.

Still another advantage of the present invention may be that it provides for a card game that ends when three Jokers are played or if a Joker is the first card out of the deck.

Other objects, features and advantages of the present invention may become apparent from the subsequent description and appended claims, taken in conjunction with the accompanying drawings.

BRIEF DESCRIPTION OF THE DRAWINGS

FIG. 2 is a flow diagram depicting a card game according to the present invention.

FIG. 5 is a flow diagram depicting an alternate embodiment of a card game according to the present invention.

BRIEF DESCRIPTION OF THE EMBODIMENT(S)

Figure 1:
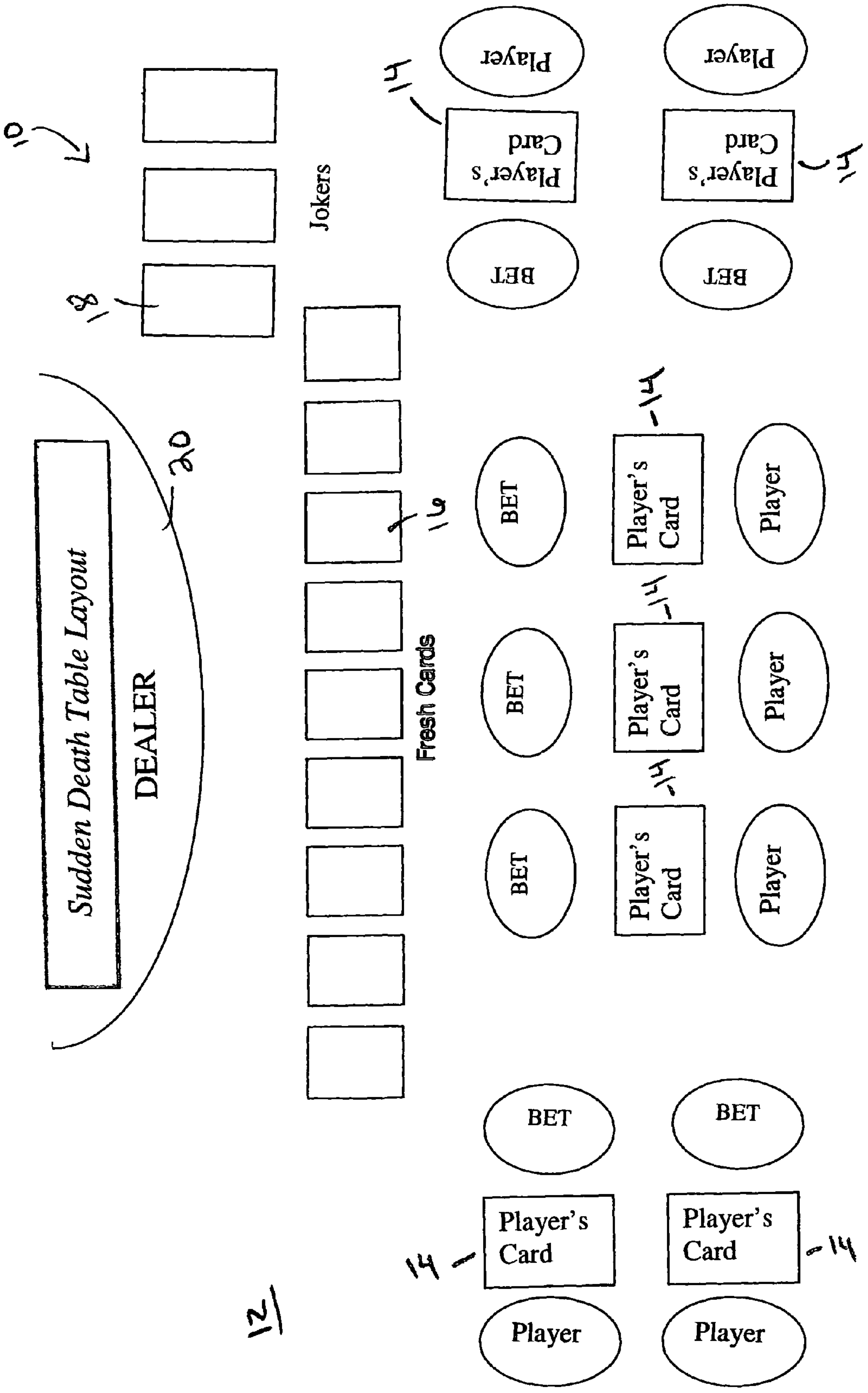
FIG. 1 is a top plan view of a table configured for use with the card game according to the present invention.

Referring to the drawings, there is shown a card game 10 and method for playing according to an embodiment of the present invention. The card game 10 generally is a matching card game which may be used for casino gaming, general gaming, video gaming and online gaming in any known electronic format. The card game, 10 casino gaming and general gaming and on video gaming screens generally may have a table layout 12 that consists of one dealer position 20 and seven player positions 14. The table layout 12 may also include fresh card positions 16, three Jokers spots 18 and one standard deck of playing cards and three Jokers which are used to play the card game. In one contemplated embodiment, the top of the table 12 is usually a felt material having printing thereon. This table 12 generally has places for seven players 14 to play. However, it should be noted that the card game 10 may be played with anywhere from one to thirty people depending on the environment in which the card game 10 is played. The fresh card positions 16 are arranged at specific areas as shown in the Figure on the table 10. In one embodiment one to twenty fresh card positions 16 may be used. The three Joker spots 18 are also arranged at a specific area on the table 10, generally near the dealer area 20, as shown in the Figures. It is also contemplated that the card game 10 may have from one to ten Joker spots 18. It some contemplated embodiments the dealer area 20 includes a location where the dealer may keep chips or other money. Typical in casino environments the dealer has available a plurality of different colored chips, for example, red, white, pink, green, black, purple, blue and each different color chip having a different monetary value.

The table 12 upon which the card game 10 is played also has seven areas in one contemplated embodiment for the players 14. It should be noted that the table top 12 shown in the Figures is just one example of a table which may be used for the card game 10 according to the present invention. It should be noted that the card game 10 may be played in a home environment with no markings on the table at all or have a place down mat made of a plastic, vinyl or other material to lay on top of a flat table including the areas as shown in the Figure. The card game 10 of the present invention is generally played with a standard fifty two card playing deck and incorporates three Jokers into the fifty two card deck. However, it is also contemplated that the card game 10 may use more than one or multiple standard deck of cards and more than three jokers.

Figure 3:
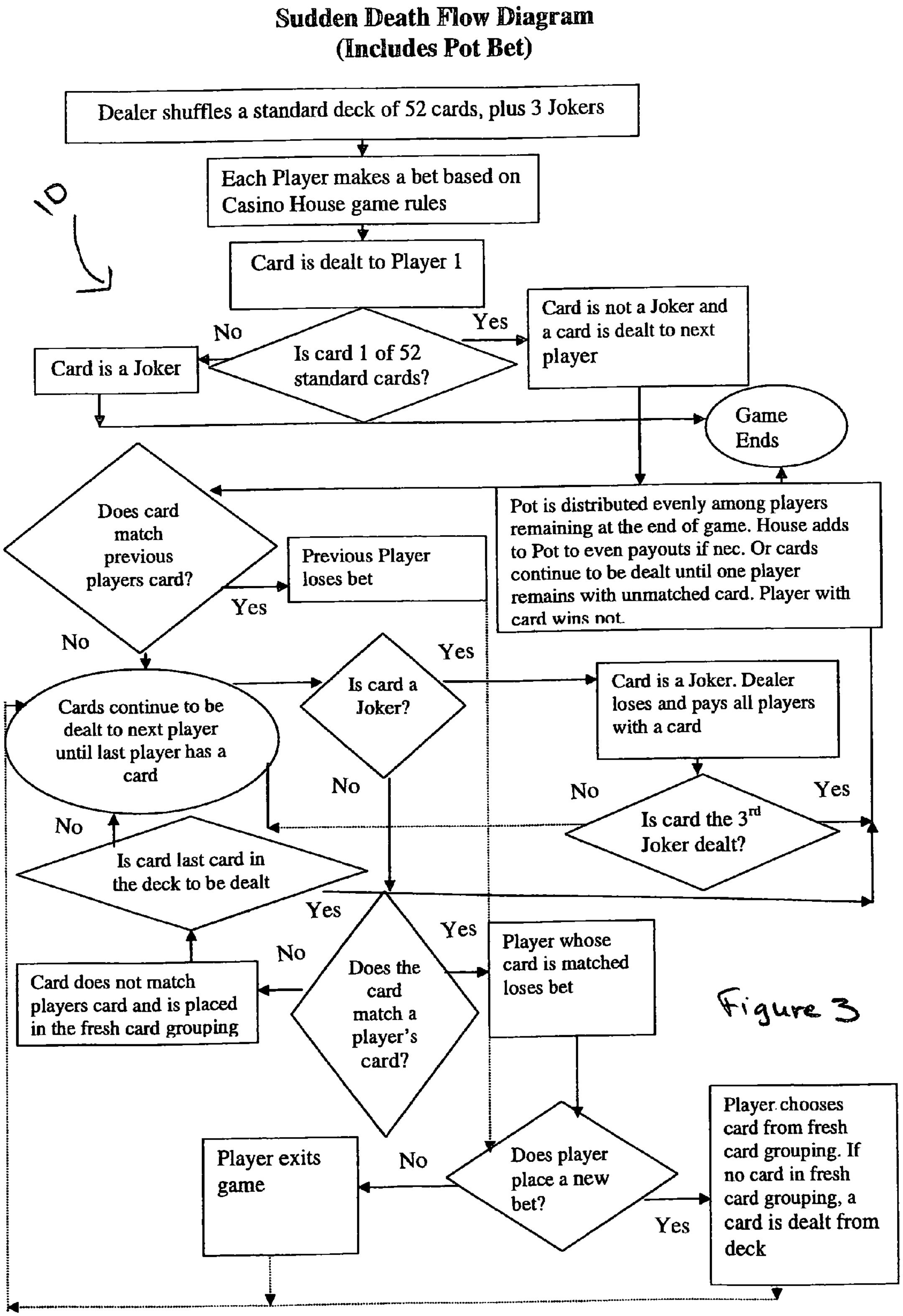
FIG. 3 is a flow diagram depicting an alternate embodiment of a card game according to the present invention.
Figure 4:
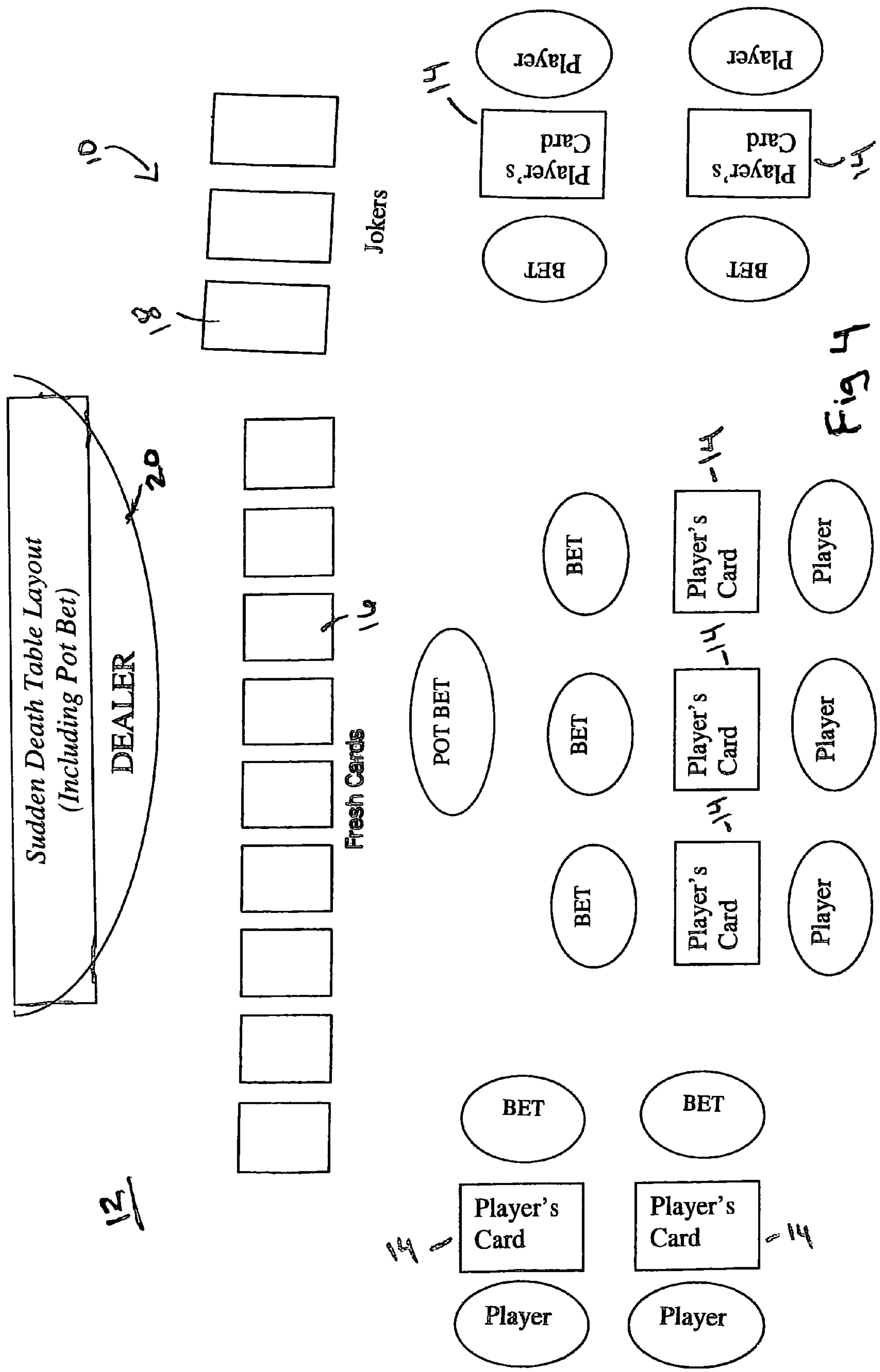
FIG. 4 is a top plan view of a table configured for use with an alternate embodiment card game according to the present invention.

The method of playing in one contemplated embodiment is shown in FIG. 2 while an alternate embodiment is shown in FIG. 3. To begin, the dealer will shuffle a standard deck of fifty two cards and the three additional Jokers in any known manner. Next, each player who plays, from one to seven in the embodiment shown, will place a bet which is determined by the game limits of either the casino, the dealer or the house in which the card game 10 is being played. Once each player has placed their initial bet or ante, the card game 10 may be started. It should be noted that in one contemplated embodiment once the card game 10 is started there is no mid shoe entry of players allowed into the card game 10 until the game is complete. However, it is also contemplated that mid shoe entry of other players may occur according to the card game 10. It should further be noted that a player who loses their bet during the game will be allowed to immediately place a new bet and reenter into that same game. However, if the player who loses their bet declines to immediately place a new bet into the current game within which they have lost, then they cannot reenter that same game and must wait until that game is over and a new game has started. If a player wins, and his bet is paid, he will remain in the game at the same initial bet amount or any other amount, which is set by the house, casino, programmer, etc. It should also be noted that a players bet cannot be taken down at any time throughout the card game 10. In fact, if a player is in the game, loses his bet and chooses to place another bet, then this player will be the first to receive the next card from the dealer. The card game 10 may end when the three Jokers are played or if a Joker is the first card out of the shuffled deck. If the first card out of the deck is a Joker, the player's bets are not paid and the house will not collect any bets placed by the players.

As shown in the Figures, one embodiment of the card game 10 may have the dealer deal the first card out of the deck to player one, wherein the dealer places that card in front of player one into player one's area at the table 12. The card is dealt face up to player one and all of the other players. Next, the dealer deals the next card out of the deck and places it in front of player two. If the card dealt to player two matches player one's card, then player one loses their bet which is collected by the dealer. Player one then may opt to stay in the game, in which case they must place a new bet on the table or they may choose not to place a new bet to remain in the game, and will exit the game and may not be involved any further in the current card game 10. If player one, who has just lost does choose to place a new bet and stay in the game, they receive the next card from the deck from the dealer. It should be noted that if there is only one player in the game, the game may continue in this manner until player one's card is matched or three Jokers are played. It should be noted that if that initial card dealt by the dealer is a Joker, the game ends, no bets are paid and the house may not collect any of the bets either. If during the card game 10 the card dealt by the dealer to any of the other players is matched by any of the other player's cards already dealt, that player whose card has been matched will lose their bet. If the losing player reenters the card game 10 and no fresh cards are available, then that player who lost receives the next card out of the deck only if that card does not match another player's card.

The card game methodology 10 then continues on by having the next card out of the deck dealt by the dealer to player three. If the card placed in front of player three matches either player one's or player two's card then that player, one or two with the matching card, will lose their bet and has the option to place a new bet to remain in the game or to exit the game. If the losing player chooses to place another bet, they receive either a card from the fresh card grouping if cards are available in the fresh card grouping, however if none are available, then they receive a card from the dealer. It should be noted that if there are only two players, the game continues until player one's card is matched, player two's card is matched, or three Jokers are played. If any of the players card is matched and a player loses their bet and no fresh cards available, then that player who lost may receive the next card out of the deck only if that card does not match another player's card.

In the methodology, the next card may then be dealt by the dealer from the deck to player four. After the card is placed in front of player four, it is determined if it matches any of the cards of player one, two or three in which case that player would lose their bet if there is a match. That player who has lost their bet would then have the option to place a new bet to stay in the game or to exit the game. If the player chooses to place another bet and stay in the game, they may receive a card from either of the fresh card grouping if there are cards arranged therein, however if no cards are available in the fresh card grouping, then they may receive a card from the deck from the dealer. It should be noted that if there are only three players in the card game 10, the game will continue until player one's card is matched, player two's card is matched, player three's card is matched or if three Jokers are played. If any player's card is matched and the player loses their bet, and no fresh cards are available, then that player who lost may receive the next card out of the deck only if that card does not match another player's card.

The card game will then continue if there are five players by having the dealer deal the next card to player five. If that card dealt to player five matches any of the cards of players one, two, three or four, that player with the matching card will lose their bet. That player who has lost their bet will then have the option to place a bet to stay in the game or to exit the game. If that player chooses to place another bet, they will receive a card from the fresh card grouping, however if none are available, then they will receive a card from the deck from the dealer. If there are only five players left, then the game will continue until player one's card is matched, player two's card is matched, player three's card is matched, player four's card is matched or three Jokers are played. It should be noted that if any player's card is matched, and a player loses their bet and no fresh cards are available, then that player who lost will receive the next card out of the deck only if that card does not match another player's card on the table. The dealer then may take the next card and deal it out of the deck to player six. If the card dealt to player six matches any of the cards of player one, player two, player three, player four or player five, that player with the matching card will lose their bet. The player who has lost their bet may have the option to place a new bet to stay in the game or to exit the game. If the player chooses to place another bet and stay in the game, they will receive a card either from the fresh card grouping, if cards are available therein, or if there are no cards available in the fresh card grouping, they will receive a card from the deck of the dealer. If there are six players in the game, the game may continue until player one's card is matched, player two's card is matched, player three's card is matched, player four's card is matched, player five's card is matched or three Jokers are played. It should be noted that if any of the player's cards are matched and that player loses his bet and no fresh cards are available, then that player who lost may receive the next card out of the deck only if that card does not match another player's card.

The dealer will then deal the next card out of the deck to player seven. After the card is placed in front of player seven, it is determined if that card matches any of the cards of player one, player two, player three, player four, player five, player six, or player seven's cards. If the dealt card does match the card of one of those players, that player will lose their bet and has the option to place a new bet to stay in the game or to exit the game. It is contemplated that matching a card means an Ace of any suit will match an Ace of any suit that is up, etc. However, if a player chooses to place another bet they may then receive a card first from the fresh card grouping, however if none are available, then they may receive a card from the deck from the dealer. If there are only seven players, the game may continue until players one's card is matched, player two's card is matched, player three's card is matched, player four's card is matched, player five's card is matched, player six's card is matched or three Jokers are played. If any of the player's cards match, then the player loses his bet and no fresh cards are available, then that player who lost may receive the next card out of the deck only if that card does not match another player's card.

During the methodology of the card game 10 described herein, the dealer continues to deal the cards as described above until no cards are left and the card dealt may either match one of the seven players cards. If the card dealt matches a players card then that player will lose his bet and may either leave the game or place a new bet and take a card from the fresh card grouping or if the card dealt by the dealer does not match any of the players cards playing, the card dealt is placed in the fresh card grouping. The other option that may occur on each of the cards dealt by the dealer is that it may be a Joker. If the card dealt is a Joker, it will be placed into one of the Joker spots. Each time the Joker is dealt each players bet is paid. After all players have received a card and the next card dealt is not a Joker and does not match any player's card, that card will be placed in the fresh card grouping. All cards that are matched are to be removed from the game. Once all cards are dealt or are removed from the game or all three Jokers are played the game will end. It should be noted that each time a player's card is matched, the player has the option of placing a new bet. If the player places a new bet, they must choose a card from the fresh card grouping. Once a player chooses a card from the fresh card grouping, or has a card dealt to him, the game continues as described herein. It should be noted that the cards from the fresh card grouping are placed face up so that when a player who chooses a card from the fresh card grouping knows the card they are choosing. It should be noted that it is also contemplated to have the cards in the fresh card grouping arranged in a face down manner.

In an alternate embodiment of the card game according to the present invention, the dealer may shuffle a standard deck of 52 cards plus three Jokers and have each player make a bet based on the house game rules into a pot, thus creating a pot bet. Just like the previous embodiment, a card is dealt to player one. If the card is a Joker the game will end. If the card is one of the standard cards and the card is not a Joker, a card is then dealt to the next player at the table. Then it is determined if that card matches any of the previous players cards. If it does match a previous player's card, that previous player will lose their bet and then have the option of placing a new bet or exiting the game. If the player chooses to place a new bet, they will choose a card from the fresh card grouping unless there are no cards in the fresh card grouping, in which case a card is dealt from the deck to that player as long as that card does not match another player's card. The game may be played the same as described above with cards being dealt to each of the players at the table and a player who has a card that is matched by the card dealt losing their bet and then having the option of either staying in the game by placing a new bet or leaving the game at that point. If the card dealt is a Joker, just as in the previous embodiment, the dealer will lose and pay all players who have a card on the table. If that Joker dealt is the third Joker the pot may be distributed evenly among players remaining at the end of the game. It should be noted that in one contemplated embodiment the house may add to the pot to even payouts so all players share equally in the winnings upon the third Joker being dealt or the last card of the deck being dealt. It should also be noted that in another embodiment, the cards continue to be dealt until one player remains with an unmatched card, this remaining player with a card wins the pot. It is also contemplated to play the game with any number of Jokers and with as many as two to twenty decks of cards. It should be noted that other changes to the game and/or the playing of the game on an electronic medium or over the Internet is also possible and contemplated in the present embodiment.

In an alternate embodiment of a card game 10 according to the present invention, the dealer may shuffle the deck of 52 cards plus three jokers and have each player make a bet based on casino house game rules or predetermined by a program in an electronic device, such as a computer, tablet, phone, laptop, mainframe, cloud based device, or the like. This embodiment of the card game 10 is played as the other embodiments described above, however this embodiment introduces new options for bets or side bets that occur within the game 10. In one contemplated embodiment, as the cards 14 are being dealt to the players, the players have the options for side bets similar to the pot bet, described above. In one contemplated embodiment, the pot bet may remain in the game and the side bets may be added on as additional betting options for a player and the organization hosting or dealing such games. One of these additional side bets is a high low bet. The low bet has a player wagering that an ace, two, three, four, five or six card is the next card dealt, i.e., betting a low card is next to be dealt. This player would win the low bet if an ace through six is dealt. The high low bet may also include a side bet of a high bet wherein if an eight, nine, ten, jack, queen or king card is the next card dealt, the player who bets high wins the side bet. However, it should be noted that if a seven is dealt as the next card on both the high and low bets, both the high and low bets will lose. In other words, the seven card is the house number and no player can bet on seven to win. A seven always means the player who has placed a high low bet loses and the house takes the money. With the high low bet, it should be noted that if a joker is dealt, then the players will neither win nor lose because the joker is defined as a push, meaning that the bets, both high and low, will remain until the next card is dealt. It is contemplated that either the high or low bets may generally be an even money bet, however it is also contemplated that all variations of wagering odds may also be used for the high low bets. Another side bet that may be used with the card game according to the present invention may be a suit bet. With the suit bet each player may bet on the suit of the next card being dealt, i.e., either a heart, spade, club or diamond. If a player bets that the next card dealt will be any denomination including a heart, and any card within the suits of hearts is dealt, that player wins and so on for the remaining suits. If a player bets on a suit and that suit is not dealt then the player loses and the house collects the money. In one contemplated embodiment the suit bet may have a wager, such as three to one. However, it is also contemplated that other wagers of odds, such as four to one, five to one, etc., may also be used for the suit bet or any of the high low bets mentioned above. It should be noted that any wager of odds in the range of two to one up to hundred to one may be used as odds for the side bets as described herein. Generally, the odds for the wagers on both the suit bets and the high low bets may be determined by the house or a computer program that controls the electronic device storing the game as described herein. It should be noted that all of the configurations of the betting as described herein, may be used in any known configuration, such as but not limited to the pot bet being used with the high low bet, but not the suit bet, or the pot bet being used with the suit bet, but not the high low bets, etc. Therefore, the side bets may be used in any combination with any of the other bets such as the pot bet and the individual bets as described a above in the application.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A method of playing a card game at a table or on an electronic device, comprising:
- shuffling a standard deck of cards and three jokers;
- at least one player placing a bet to initiate a game;
- dealing a first of said cards to said at least one player;
- determining if said first card dealt is one of said jokers, if said first card is one of said jokers said game ends and no said bet is paid;
- dealing a next card to a next player,
- determining if said next card dealt matches said first card or a previously dealt next card, if said next card matches a previous players card said previous player loses said bet;
- placing said next card in a fresh card group if said next card does not match said first card or said previously dealt next card;
- choosing a card from said fresh card group if said next card matches said first card or said previously dealt next card and a new bet is made; and
- determining if a last card of said cards has been dealt.

2. The method of claim 1 further comprising determining if said next card is one of said jokers.

3. The method of claim 2 wherein if said next card is a joker, dealer loses said bet and pays said at least one players and said next player with said first card, said next card, or said previously dealt next card.

4. The method of claim 1 further comprising determining if one of said three jokers is a third joker dealt.

5. The method of claim 4 wherein if said third joker is dealt the card game ends.

6. The method of claim 1 wherein if no card is available in said fresh card grouping said next card is dealt from said deck.

7. The method of claim 1 wherein said cards are dealt to said next player until a last player has said card.

8. The method of claim 1 wherein said previous player losing said bet may place said new bet to stay in said game or exit said game.

9. The method of claim 1 further comprising placing of bets by all players of the game before said first card is dealt and without an opportunity of mid shoe entry.

10. The method of claim 1 further comprising placing of bets by all players based on house game rules or a predetermined stored file on a computer, phone or tablet into a pot before said first card is dealt.

11. The method of claim 10 wherein said pot is distributed evenly among said players remaining at an end of the game.

12. The method of claim 10 wherein said house adds to said pot to even payout so all of said players share equally in said pot.

13. The method of claim 1 further comprising one of said players placing a side bet on if said next card is a member of a low group, a high group or a particular suit.

14. The method of claim 13 wherein said side bet is an even money bet, an odds bets in a range of two to one through twenty to one or a push if said joker is said next card dealt.

15. The method of claim 13 wherein said low group is an ace, two, three, four, five or six card.

16. The method of claim 13 wherein said high group is an eight, nine, ten, jack, queen, or king card.

17. A method of playing a card game at a table or on an electronic device, comprising:

shuffling a standard deck of fifty two cards together with three jokers;

placing of a bet by each player of the game;

dealing one of said cards to one of said players;

determining if one of said cards is one of said jokers;

ending the game without paying said bet if said one of said cards is said joker;

dealing another of said cards to a next player if said one of said cards is not said joker;

determining if said another of said cards matches a previous players card;

losing of said bet by said previous player if said another of said cards matches said previous players card or dealing said another of said cards to said next player until a last player has said card;

determining if said another of said cards is one of said jokers;

if said another of said cards is said joker said dealer loses and pays all said players with said card;

determining if said card dealt is a third joker dealt;

placing a card in a fresh card grouping if said card dealt does not match said players card; and determining if said card dealt is a last card of said shuffled cards.

18. The method of claim 17 further comprising determining if said previous players who loses bet places a new bet to stay in game or exits the game.

19. The method of claim 18 wherein said previous player who places said new bet chooses said card from said fresh card group or is dealt said card from said deck if said fresh card group has no said cards.

20. The method of claim 17 wherein said bet is a single bet, a pot bet, a low bet, a high bet or a suit bet.

* * * * *